United States Patent Office 3,174,941
Patented Mar. 23, 1965

3,174,941
STABILIZED POLYSTYRENE COATING
COMPOSITION
Walter P. Ericks, Lockport, and Russell L. Yarnall, Lewiston, N.Y., assignors to The Upson Company, Lockport, N.Y.
No Drawing. Filed Apr. 3, 1961, Ser. No. 99,984
5 Claims. (Cl. 260—23)

This invention relates to the stabilizaton of polystyrene coating compositions against polymerization during the processing and storing of the same, and against retardation of the drying rate of paint or enamel coatings applied over the polystyrene coating.

Attempts to use polystyrene resins in the formulation of coating compositions have not proven satisfactory, not only because of their incompatibility with common plasticizers and common resins, such as alkyds, vinyls, acrylates and cellulose acetate and nitrate, but also because of limited solubility of inert high molecular weight polystyrene in common solvents.

In order to overcome the objectionable limitations of solubility and compatibility, attempts have been made to use polystyrenes of medium molecular weight. It was found, however, that the medium molecular weight polystyrenes when dissolved in a solvent, undergo further polymerization during storing and particularly in processing of coating compositions. The uncontrollable polymerization made the properties of the coating compositions unpredictable and greatly impeded the grinding of the coatings and set a limit to their useful life. Consequently, polystyrene of medium molecular weight when used in the formulation of coating compositions had to be stabilized against further polymerization, but the stabilizers commonly employed in the past such as hydroquinone, para-tertiary butyl catechol, and other antioxidants, retarded substantially the drying rate of the oil or alkyd films of paints on enamels applied over the dry films of polystyrene coatings, thus limiting their usefulness.

One object of the present invention, therefore, is the provision of polystyrene compositions having superior characteristics of solubility and compatibility with common plasticizers and common resins.

Another object is the provision of such a coating stabilized against further polymerization during storing and the processing of coating compositions.

A further object is to provide coatings of the above nature with predictable and stable properties and free from the tendency to retard the drying rate of paints or enamels applied over the dry films of such coatings, thereby promoting their usefulness.

This application is a continuation-in-part of our pending application Serial No. 777,192, filed December 1, 1958, now abandoned, which is in turn a continuation-in-part of our application Serial No. 496,052, filed March 22, 1955, now abandoned.

In the course of our research for solution of the above problems, we have found that relatively minor proportions of unsaturated fatty vegetable drying oils such as tung oil, linseed oil, oiticica oil, dehydrated castor oil, soyabean oil, sunflower oil, hemp oil and unsaturated fatty vegetable drying oil acids, which occur as glyceryl esters in such drying oils, either totally prevent or substantially eliminate the further polymerization of polystyrenes having a medium average molecular weight and can be used with such polystyrenes without retarding the drying rate of oils, paints and enamels when the latter are applied over the dry film of polystyrene compositions. This unexpected discovery has been utilized by us in the formulation of a superior type of polystyrene composition which can be satisfactorily used as decorative and protective coatings and subsequently coated with ordinary paints and enamels without the inconvenience and expense resulting from a long period of drying.

While certain specific drying oils are listed above for purposes of illustration, it may be said that the vegetable drying oils suitable for use in the present invention are triglyceride oils containing at least 50% of triglycerides of higher fatty acids having 14, 16 or 18 carbon atoms and at least two double bonds in the molecule. Preferably the double bonds will be conjugated but one of the most satisfactory drying oils for use in the invention is linseed oil, a principal fatty acid component of which is linolenic acid which contains three unconjugated double bonds, each separated by a methylene group. Linseed oil and the other vegetable oils may be used in crude or raw form but it is preferred that they be refined to remove phospatides and mucilaginous substances which are present in the crude oils. The so-called "bodied" linseed oil of commerce obtained by heating linseed oil may also be employed and, in fact, it may be said that any of the commercial forms of drying oils may be used.

It should be pointed out that the vegetable drying oil need not occur naturally. A drying oil suitable for use in the invention can be prepared by chemically converting a non-drying or semi-drying oil to one which has drying properties. An example of this is the dehydrated castor oil mentioned above. Ricinoleic acid, the main constituent of castor oil, contains only one double bond, but an additional one is introduced by eliminating the elements of water by heating in the presence of a dehydrating agent. The resulting drying oil contains both 9,12-linoleic acid, which is non-conjugated, and 9,11-linoleic acid, which is conjugated.

In general, the vegetable drying oils suitable for use in the invention may be defined as those having approximately a saponification value of 186–196, iodine numbers of 124–204 and containing in excess of 50% of unsaturated acids of 14, 16 and 18 carbon atoms with at least two double bonds.

As stated earlier, the drying oil acids derived from vegetable drying oils may be used in place of the oils, themselves. As examples of such acids, there may be mentioned the following: linoleic acid, linolenic acid, eleostearic acid, 4-ketoeleostearic acid, and parinaric acid.

The quantity of such vegetable drying oils or vegetable drying oil acids required for preventing the further polymerization of polystyrenes of medium average molecular weight usually amounts to but a few percent. In some instances, even a fraction of $\frac{1}{10}$% of vegetable drying oil or unsaturated vegetable oil acid, based on the weight of the polystyrene, was effective for the elimination of substantially all further polymerization of medium average molecular weight polystyrenes. The upper limit of the percent of drying oil, or unsaturated acid, which could be used in the coating composition has been usually determined by the development of incompatibility. In some instances, quite satisfactory coating compositions have been prepared containing up to somewhat over 10% of vegetable drying oil or unsaturated vegetable oil acid, based on the weight of polystyrene, but we have found that in most instances a quantity of from 1/10% to 10% based on the weight of the polystyrene is sufficient to accomplish the objects of the invention. In such cases, the vegetable drying oil or the unsaturated vegetable oil acid exhibited, besides the stabilizing effect, a pronounced plasticizing effect on polystyrene, but this auxiliary effect is of less importance become superior plasticizers for polystyrene such as butyl-phthalyl-butyl-glycolate have been known to the trade.

The polystyrene of medium average molecular weight, herein referred to, comprises polymers having an average molecular weight ranging between 15,000 and 85,000. This range represents those polystyrenes which are relatively hard and non-tacky and yet have sufficient solubility in at least one of the common organic solvents that suitable coating compositions containing them may be formulated. They may be further characterized as polystyrenes whose 10% solutions in toluene at 25° C. have viscosities ranging from approximately 3 to 65 centipoises.

Our discovery gives the formulator a wide latitude in the selection of melting point, viscosity, hardness and solubility of the coating composition, which can be subsequently coated with ordinary paints and enamels without decreasing their rate of drying. Such polystyrenes are soluble in inexpensive organic solvents, such as xylol, toluene, benzene, methyl-ethyl ketone, acetone and the like, the solubilizing properties of which can be either increased by the incorporation of a ketone or decreased by the incorporation of an aliphatic hydrocarbon. The coatings thus formulated possess excellent electrical properties, color retention and resistance to water and chemicals such as acids, alkalis and alcohols.

A coating composition embodying this invention comprises a minor proportion, preferably 15 to 35% by weight, of a polystyrene, such as described above, together with the stabilizer of this invention dissolved in a major proportion of a suitable volatile organic solvent, and including the desired pigments and extenders and plasticizers. The polystyrene, obtainable commercially as a fine white powder, is ground in a mill with the solvent, stabilizer, plasticizers, pigments and other suitable components to produce a uniform composition which may then be applied by any of the conventional methods.

The following examples illustrate a number of compositions embodying the invention, but they are to be construed as exemplary rather than as limitations.

*Example I*

An ivory colored coating was prepared by charging the following materials into a pebble mill and grinding them approximately 20 hours:

| | Parts by weight |
|---|---|
| Xylene | 1080 |
| Lacquer thinner (butyl acetate) | 125 |
| Tung oil | 17.5 |
| Titanium dioxide and extender | 525.0 |
| Polystyrene (viscosity of 10% solution in toluene at 25° C.=3 centipoises) | 350.0 |
| Polybutene (average molecular weight=660) | 52.8 |
| Aluminum stearate | 20.9 |
| Iron oxide tinting pigments | 6.75 |

The viscosity of the above composition was approximately 83 seconds at 20 deg. C. as measured by a No. 4 Ford Cup and 400 centipoises as measured by the Brookfield viscometer.

*Example II*

This composition was prepared by the use of the identical method, materials and quantities as Example I, except that the tung oil was replaced by an equal quantity of linseed oil.

The viscosity of this coating compositon was 79 seconds at 22 deg. C. when measured by a No. 4 Ford Cup.

*Example III*

The following materials were charged into the pebble mill and ground for 20 hours.

| | Parts by weight |
|---|---|
| Xylene | 1080.0 |
| Lacquer thinner (butyl acetate) | 135.0 |
| Tung oil | 3.5 |
| Titanium dioxide and extenders | 525.0 |
| Polystyrene (viscosity of 10% solution in toluene at 25° C.=3 centipoises) | 350.0 |
| Aluminum stearate | 20.9 |
| Iron oxide titanium pigments | 6.75 |

The viscosity of this coating composition was 62 seconds at 22 deg. C. when measured by the No. 4 Ford Cup. Omission of the tung oil in the preparation of the above coating composition returned in a substantially higher viscosity.

*Example IV*

The following materials were charged into a pebble mill and ground for 8 hours:

| | Parts by weight |
|---|---|
| Polystyrene (viscosity of 10% solution in toluene at 25° C.=15 centipoises) | 50 |
| Xylene | 200 |
| Titanium dioxide | 50 |
| Tung oil | 10 |

The viscosity was 122 seconds when measured by a No. 4 Ford Cup. The polystyrene employed was a commerical product having a medium average molecular weight of 48,000. The titanium dioxide was a rutile type compound of technical grade.

The viscosity remained substantially the same when tung oil in the above formula was replaced with one part of para-tertiary butyl catechol. However, when none of the stabilizers was employed in the above formula, the viscosity was 223 seconds when measured by a No. 4 Cup. The drying rate was substantially retarded when paint was applied over the dry film of coating composition para-tertiary butyl catechol as a stabilizer but was not affected when tung oil was used as a stabilizer.

*Example V*

The following materials were charged and ground in a pebble mill for 20 hours:

| | Parts by weight |
|---|---|
| Xylene | 1030.3 |
| Lacquer thinner (butyl acetate) | 135.0 |
| Dehydrated caster oil | 7.0 |
| Titanium dioxide and extender | 525.0 |
| Diatomaceous silica | 30.0 |
| Polystyrene (viscosity of 10% solution in toluene at 25° C.=15 centipoises) | 350.0 |
| Polybutene (average molecular weight=660) | 52.8 |
| Aluminum stearate | 20.9 |
| Tinting pigments | 6.75 |

The viscosity at 22 deg. C. was 560 centipoises. When the castor oil was replaced by tung oil in the above formula, the viscosity was 530 centipoises and when replaced by oiticica oil, the viscosity was 520 centipoises. When none of the drying oils were used in the above formula, the viscosity of the coating was then over 6000 centipoises.

The diatomaceous silica in this example is a commercial product, available as a fluffy powder having a bulking value of 19.2 pounds per gallon and retaining 3% solids maximum when passed through a 325 mesh screen. The drying oils of this and the previous examples are common commodities of trade. Other components of this example were identical to those used in Example I.

*Example VI*

The following materials were charged into a pebble mill and ground for 20 hours:

| | Parts by weight |
|---|---|
| Xylol | 1060 |
| Lacquer thinner (butyl acetate) | 135 |
| Oiticica oil | 3.5 |
| Titanium dioxide and extenders | 577.5 |
| Polystyrene (viscosity of 10% solution in toluene at 250° C.=3 centipoises) | 350 |
| Polybutene (average molecular weight=660) | 24.5 |
| Aluminum stearate | 20.9 |
| Tinting pigments | 9.0 |
| Diatomaceous silica | 33.0 |

The viscosity obtained was 94 seconds at 20 deg. C. when measured by a No. 4 Ford Cup. Nearly identical results were obtained when oiticica oil in the above formula was replaced by tung oil. The viscosity of the coating was greatly increased when the drying oil was omitted. The polybutene had an average molecular weight of 660 and a viscosity of 38 centipoises at 25 deg. C. Other components in this example were identical to those of Example V.

*Example VII*

The following materials were charged into a pebble mill and ground for 20 hours:

| | Parts by weight |
|---|---|
| Xylene | 1090.0 |
| Linseed fatty acids | 6.4 |
| Polystyrene (viscosity of 10% solution in toluene at 25° C.=15 centipoises) | 318.0 |
| Butyl phthalyl butyl glycolate | 31.8 |
| Aluminum stearate | 15.4 |
| Titanium dioxide and extender | 386.0 |
| Diatomaceous silica | 32.5 |
| Tinting pigments | 4.8 |

The viscosity was 580 centipoises at 21 deg. C. when measured by the Brookfield viscometer. When linseed fatty acids were omitted, the viscosity increased at 670 centipoises under the same conditions of testing.

The linseed fatty acids used in this example as stabilizers against further polymerization and the butyl phthalyl butyl glycolate used as a plasticizer for the polystyrene are products of commerce. Other materials in this example were identical to those of Example I.

*Example VIII*

The following materials were charged into a pebble mill and ground for 16 hours:

| | G. |
|---|---|
| Polystyrene (Dow Resin PS-3, a polystyrene having an average mol. wgt. of 15,000 and a viscosity of its 10% solution in toluene at 25° C. of 3 centipoises) | 75.0 |
| Xylol | 100.0 |
| Tung oil | 5.0 |
| Titanox RA | 75.0 |

The viscosity was 180 seconds when measured with the No. 4 Ford Cup at 70 degrees F. This viscosity was reduced to 79 seconds by the addition of 6.3% xylol based on the weight of the coating. A wet film of 0.006" thickness was applied to paper liner of 0.042" thickness and dried. After evaporation of solvents from the coating the dried film adhered well and was not tacky. Such a coated liner could be rolled up without sticking, and thus was satisfactory for the manufacture of a coated sheet by a continuous process.

*Example IX*

The following materials were charged into a pebble mill and ground for 16 hours:

| | G. |
|---|---|
| Polystyrene (Dow Resin PS-3, a polystyrene having an average mol. weight. of 15,000 and a viscosity of its 10% solution in toluene at 25° C. of 3 centipoises) | 75.0 |
| Xylol | 100.0 |
| Tung oil | 0.75 |
| Titanox RA | 75.0 |

The viscosity was 91 seconds when measured with the No. 4 Ford Cup at 70 degrees F. A wet film of 0.006" thickness was applied to paper liner of 0.042" thickness and dried. After evaporation of solvents from the coating the dried film adhered well and was not tacky. Such a coated liner could be rolled up and thus was satisfactory for the manufacture of a coated sheet by a continuous process.

Oil and alkyd paints applied over the dried films of the coating compositions of all of the above examples dried at their normal rates.

To further illustrate the effectiveness of the present stabilized polystyrene coating compositions, a sample of the coating was made identical to that shown in Example I, but omitting the tung oil in its formulation. This coating, hereafter referred to as coating I(a) has the viscosity of 6200 centipoises at 21 deg. C. by the Brookfield viscometer. Since the original coating of Example I had a viscosity of about 400 centipoises at 20 deg. C., it will be seen that the omission of the small amount of tung oil specified exercises a very great effect on the viscosity. This indicates the effectiveness of the tung oil composition.

A second coating material was made in a manner identical to Example I with the exception that the tung oil was replaced by 5.3 parts of para-tertiary butyl catechol. This coating, hereafter designated as I(b) had a viscosity of 84 seconds at 22 deg. C. when measured by a No. 4 Ford Cup. Thus, it can be seen that the catechol formulation also prevents the polymerization of the polystyrene since the viscosity of this formulation is identical to the viscosity of Example I.

Test panels were coated with the materials prepared according to Examples I and I(a) and I(b). After they had been thoroughly dried, a portion of each was coated with commercial paints as hereafter described.

Commercial paint No. 1 contained tung oil, dehydrated castor oil and ester gum as binders. Commercial paint No. 2 contained soyabean alkyd as a binder. Commercial paint No. 3 was a standard "outside" paint containing raw and boiled linseed oils as binders. Commercial paint No. 4 was a satin gloss finish containing soyabean alkyd resin as a binder.

Paint coatings Nos. 1 to 4, inclusive, were applied over panels primed with the polystyrene compositions of Examples I, I(a) and I(b) as explained above. The drying times of the finished paint coatings are shown in the following table:

| Commercial Paint Coating | Polystyrene I, hours | Polystyrene I(a), hours | Polystryene I(b), days |
|---|---|---|---|
| No. 1 | 21 | 21 | 3 |
| No. 2 | 3½ | 3½ | 28 |
| No. 3 | 21 | 21 | 2 |
| No. 4 | 21 | 21 | 4 |

Examination of the above table shows the effect of the inhibitors in the polystyrene coatings on the drying rates of the paint coatings applied thereover. As may be seen by comparing the first two columns in the table, the addition of tung oil as an inhibitor had no measurable effect on the drying rates of the paint coatings applied over the polystyrene coatings. However, as can be seen by comparing the third column with the first two columns, the use of catechol as a stabilizer greatly increases the drying time required by the paint coating. This table shows that the use of vegetable drying oils as stabilizers of polystyrene coating materials has no measurable effect on the drying rates of paint coatings applied thereon.

It will thus be seen that the invention accomplishes its stated objects. The use of vegetable drying oils and their corresponding unsaturated fatty acids, effectively prevents spontaneous polymerization of polystyrene and thereby permits the use of the described polystyrenes in coating formulas, avoiding the difficulties inherent in the use of polystyrenes of high average molecular weight. Furthermore, the fact that such polystyrenes are soluble in the common solvents permits a wide latitude in choice of such resins and solvents, so that coating formulations embodying the invention may be easily and conveniently modified to suit any particular use. Formulations of the invention are stable, and there is no noticeable increase in the viscosity during storage. These formulations have no noticeable deleterious effects on the drying rates of the paint coatings applied thereover, so that they are ideally suitable as base coatings or primers for paint or enamel finishes.

The coating compositions of the above examples, for example, lend themselves well to industrial applications employing reverse roll, dip knife or spray coating machines. In such applications, rapid evaporation of solvents is required for high speed production. The evaporation of solvents can be further enhanced by total or partial replacement of xylol with lower boiling solvents, such as toluene, benzene, methyl-ethyl ketone and acetone.

In the event it is desired to use the coatings by hand brushing, or hand rolling, then the slow evaporating solvent will be more suitable than the fast evaporating solvents in the formulation of coatings because the slow drying solvents will afford more uniform spreading of the coating and, at the same time, will minimize any health or fire hazards.

The following solvents are suitable in formulations of paints for brush application: Higher molecular weight aromatic solvents, such as Solvesso 100 and 150, and ketones which evaporate slowly at room temperature, such as methyl amyl ketone and isophorone.

Ordinary paints having drying oils and alkyd resins such as binders and water emulsion coatings, adhere well to the dried coatings of this invention.

While the present disclosure refers in an exemplary way to the details of preferred embodiments, it is to be understood that such reference is intended in an illustrative, rather than a limiting sense, as it is contemplated that various modifications in the materials and methods of combining the same will readily occur to those skilled in the art, within the spirit of the invention and the scope of the appended claims.

We claim:

1. A coating composition comprising a minor proportion of a resinous component consisting essentially of polystyrene having a viscosity of its 10% solution in toluene at 25° C. of approximately 3 to 65 centipoises; a major proportion of a volatile organic solvent in which said resinous component is dissolved; and from approximately 0.1 to 10.0% based on the weight of said polystyrene of a material selected from the group consisting of vegetable drying oils containing at least 50% of triglycerides of higher fatty acids having at least two double bonds in the molecule and vegetable drying oil acids, said material inhibiting further polymerization of said polystyrene.

2. The coating composition specified in claim 1 in which said material is linseed oil.

3. The coating composition specified in claim 1 in which said material is tung oil.

4. The coating composition specified in claim 1 in which said material is oiticica oil.

5. The coating composition specified in claim 1 in which said material is dehydrated castor oil.

References Cited by the Examiner
UNITED STATES PATENTS

| | | | |
|---|---|---|---|
| 2,463,023 | 3/49 | Daniels et al. | 260—19 |
| 2,655,488 | 10/53 | Kanning et al. | 260—235 |
| 2,736,715 | 2/56 | Brunner | 260—23 |

OTHER REFERENCES

Hewitt et al.: J. Oil and Colour Chemist's Association, vol. XXIX (No. 312), June 1946.

LEON J. BERCOVITZ, *Primary Examiner.*

MILTON STERMAN, DONALD E. CZAJA,
*Examiners.*